United States Patent [19]

Shelton

[11] Patent Number: 4,932,245

[45] Date of Patent: Jun. 12, 1990

[54] MAGNETIC RING MOUNTING FIXTURE

[75] Inventor: Randolph A. Shelton, Newport News, Va.

[73] Assignee: Siemens-Bendix Automotive Electronics L.P., Troy, Mich.

[21] Appl. No.: 394,599

[22] Filed: Aug. 16, 1989

[51] Int. Cl.⁵ .............................................. G01P 3/48
[52] U.S. Cl. ..................................... 73/118.1; 324/173
[58] Field of Search ....................... 73/118.1, 494, 518, 73/488; 324/173, 174, 178, 179

[56] References Cited

U.S. PATENT DOCUMENTS 4,161,120 7/1979 Cloarec .......................... 324/173 X
4,667,156 5/1987 Machino et al. ................. 324/179 X Primary Examiner—Jerry W. Myracle
Attorney, Agent, or Firm—George L. Boller; Russel C. Wells

[57] ABSTRACT

A vehicle wheel speed sensing system comprises a magnetic ring mounted on the wheel hub and a sensor mounted on the spindle. The magnetic ring is polarized at regular circumferential intervals so that as the hub rotates on the spindle, magnetic impulses are detected by the sensor which generates an electrical signal corresponding to the rotational speed of the hub. The radially inner surface of the magnetic ring is non-circular and fits onto a correspondingly non-circular radially outwardly facing surface of a groove in the hub. The groove also comprises an axially inwardly facing shoulder against which the magnetic ring is disposed. A sealing ring that seals the axially inner end of the hub to the spindle also has a portion that radially overlaps the magnetic ring for cooperating with the groove shoulder to axially capture the magnetic ring on the hub. In this way no separate attaching parts are required for mounting the magnetic ring on the hub.

12 Claims, 1 Drawing Sheet

4,932,245

MAGNETIC RING MOUNTING FIXTURE

BACKGROUND AND SUMMARY OF THE INVENTION

This invention relates to a magnetic ring mounting fixture for the mounting of a magnetic ring on an automotive vehicle wheel hub. The magnetic ring rotates with the hub, and a stationary sensor disposed adjacent the magnetic ring picks up impulses from the magnetic ring to provide an electrical signal representative of wheel speed.

It is known to mount a magnetic ring on the wheel hub of an automotive vehicle. The magnetic ring is polarized at regular intervals so that when the wheel hub rotates, magnetic impulses are detected by an adjacent stationary sensor to provide an electrical signal representative of wheel speed.

The present invention relates to a new and unique means for mounting the magnetic ring on the wheel hub. One of the features of the invention is that the mounting takes advantage of the presence of other parts so that mounting is accomplished without separate attaching parts. As a result, when a wheel speed sensing function is incorporated into an automotive vehicle wheel, the invention enables meaningful cost economies to be achieved in comparison to other means for mounting the magnetic ring on the wheel hub. Further features of the invention will appear in the following detailed description of a presently preferred embodiment of the invention. Drawings accompany the description and illustrate a presently preferred embodiment of the invention in accordance with the best mode contemplated at the present time for carrying out the invention.

DESCRIPTION OF THE PREFERRED EMBODIMENT

Figure 1:
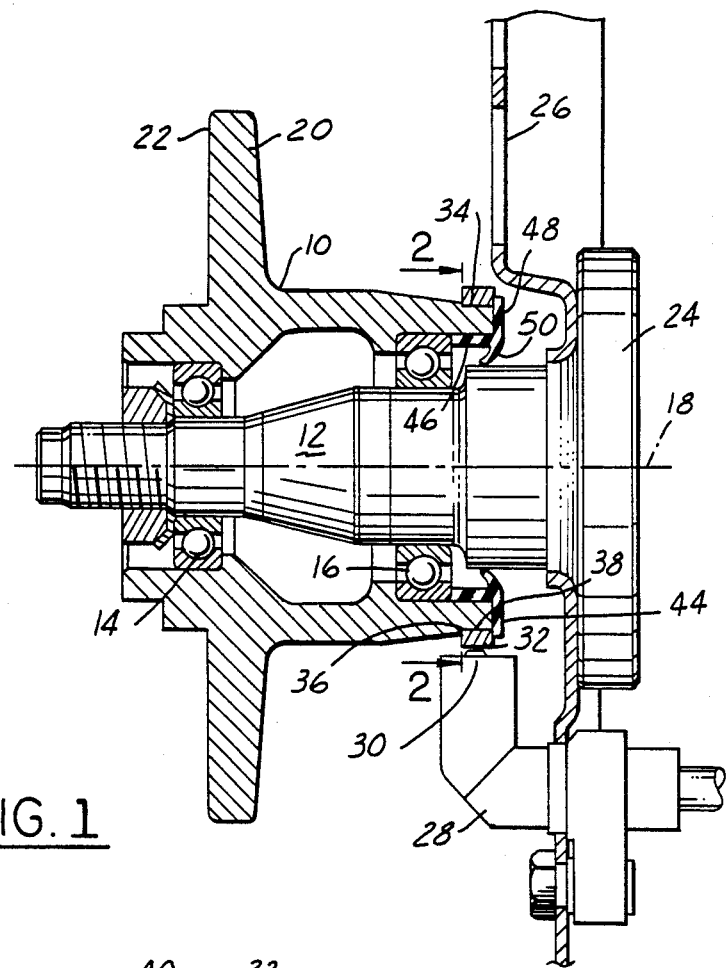
FIG. 1 is a view, partly in cross section, of an automotive vehicle wheel hub and spindle including a wheel speed sensing means depicting principles of the invention.
Figure 2:
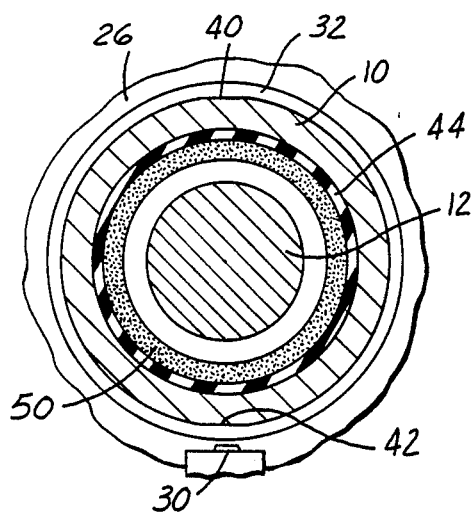
FIG. 2 is a transverse cross sectional view taken in the direction of arrows 2—2 in FIG. 1.
Figure 3:
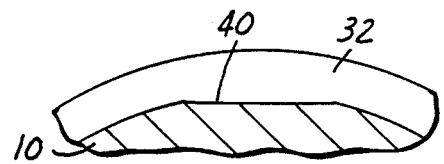
FIG. 3 is an enlarged view of a portion of FIG. 2.

The drawings show a wheel hub 10 that is journaled on a spindle 12 by means of bearings 14, 16 for rotation about the spindle axis 18. The hub has a radial flange 20 against whose axially outer face 22 a wheel (not shown) is adapted to be disposed and fastened by conventional means such as lug nuts. The axially inner end of the spindle has a radial flange 24, and a backing plate 26 is affixed to the axially outer face of flange 24 by any conventional means of attachment.

A sensor 28 is fixedly mounted on backing plate 26 in radially outwardly spaced relation to the spindle and hub. Sensor 28 has a sensing tip 30 that confronts, but is spaced just slightly radially outwardly of, a magnetic ring 32 that is fixedly mounted on the axially inner end of hub 10.

The axially inner end of hub 18 comprises a groove 34 extending around the outside surface of the hub. The groove is defined by an axially inwardly facing shoulder 36 and a non-circular radially outwardly facing surface 38. Magnetic ring 32 has a generally rectangular cross section and fits into groove 34 such that with a radially inner portion of the axially outer face of the ring disposed against the axially inwardly facing shoulder of the groove, the axially inner face of the ring is substantially flush with the axially innermost surface of the hub.

The radially inner face of ring 32 is made non-circular in the same manner as surface 38. In this way the magnetic ring is keyed to the hub for rotation therewith. An especially advantageous pattern for the non-circularity is to have the respective surfaces circular, except for two flats 40, 42 on diametrically opposite sides. Such flats can be readily incorporated into the magnetic ring and machined into the hub. The flats have limited circumferential extent about axis 18.

A sealing ring 44 fitted to the axially inner end of the hub performs the double function of forming a grease seal for the axially inner end of the interior of the hub and of cooperating with shoulder 36 to axially capture magnetic ring 32. Ring 44 comprises an axial wall 46 that is press-fitted into the axially inner end of the hub, a radial wall 48 that extends radially outwardly from the axially inner end of wall 46 to radially overlap magnetic ring 32, and a lip 50 that curls radially inwardly and axially outwardly from the junction of walls 46 and 48 to form a wiper-type seal against spindle 12.

The magnetic ring is magnetically polarized at regular intervals so that as the hub rotates on the spindle, the magnetic impulses are detected by sensor 28 which then provides an electrical signal representing the instantaneous rotational velocity of the wheel hub. By way of example, sensor 28 may be a Hall sensor.

Because of the non-circular fitting of the magnetic ring onto the hub and the use of the sealing member for axially capturing the magnetic ring on the hub, no separate parts are required for mounting the magnetic ring on the hub.

While a preferred embodiment of the invention has been described, it should be understood that principles of the invention are applicable to other embodiments.

What is claimed is:

1. An automotive vehicle wheel spindle and hub assembly wherein a wheel-carrying hub is journaled on a spindle for rotation about an axis and a speed sensing means is associated with the assembly for providing an electrical signal corresponding to the rotational speed of the hub on the spindle, said speed sensing means comprising a magnetic ring that is fixedly mounted on said hub concentric with the axis and that is magnetically polarized at regular circumferential intervals about the axis, a speed sensor, and means for mounting said speed sensor in stationary relation to said spindle and proximate said magnetic ring such that said speed sensor detects the passage of said regular polarized intervals past the sensor as said hub and magnetic ring rotate past the speed sensor, the improvement which comprises said hub having a groove comprising a shoulder that faces axially inwardly and a non-circular surface that faces radially outwardly, said magnetic ring having a non-circular radially inwardly facing surface matching said non-circular surface of said groove in said hub, said magnetic ring fitting onto said non-circular surface of said groove in said hub and against said shoulder so that said magnetic ring is thereby keyed to said hub, and a sealing ring fitted to the axially inner end of said hub to seal between said hub and spindle, said sealing ring comprising a radially inwardly disposed circular sealing lip in wiping contact with said spindle and a radially outwardly disposed portion that cooperates with said shoulder in axially capturing said magnetic ring on said spindle.

2. The improvement set forth in claim 1 in which said radially outwardly disposed portion of said sealing ring is the radially outer terminus of a radial wall of said sealing ring.

3. The improvement set forth in claim 2 in which said sealing ring also has an axial wall extending axially outwardly from said radial wall of said sealing ring and disposed against a radially inner wall surface of said hub, said circular sealing lip extending from the junction of said radial and axial walls of said sealing ring.

4. The improvement set forth in claim 3 in which said circular sealing lip curls axially outwardly in the radially inward direction.

5. The improvement set forth in claim 1 in which the non-circularities of the radially inner surface of said magnetic ring and of said radially outwardly facing surface of said groove are formed by one or more flats.

6. The improvement set forth in claim 5 in which the non-circularities of the radially inner surface of said magnetic ring and of said radially outwardly facing surface of said groove are formed by a pair of flats arranged diametrically opposite each other.

7. An automotive vehicle wheel spindle and hub assembly wherein a wheel-carrying hub is journaled on a spindle for rotation about an axis and a speed sensing means is associated with the assembly for providing an electrical signal corresponding to the rotational speed of the hub on the spindle, said speed sensing means comprising a ring that is fixedly mounted on said hub concentric with the axis and that cooperates with a speed sensor that is mounted in stationary relation to said spindle and proximate said ring such that said speed sensor detects the passage of regular intervals of said ring past the sensor as said hub and ring rotate past the speed sensor, the improvement which comprises said hub having a groove comprising a shoulder that faces axially inwardly and a non-circular surface that faces radially outwardly, said ring having a non-circular radially inwardly facing surface matching said non-circular surface of said groove in said hub, said ring fitting onto said non-circular surface of said groove in said hub and against said shoulder so that said ring is thereby keyed to said hub, and a sealing ring fitted to the axially inner end of said hub to seal between said hub and spindle, said sealing ring comprising a radially inwardly disposed circular sealing lip in wiping contact with said spindle and a radially outwardly disposed portion that cooperates with said shoulder in axially capturing said first-mentioned ring on said spindle.

8. The improvement set forth in claim 7 in which said radially outwardly disposed portion of said sealing ring is the radially outer terminus of a radial wall of said sealing ring.

9. The improvement set forth in claim 8 in which said sealing ring also has an axial wall extending axially outwardly from said radial wall of said sealing ring and disposed against a radially inner wall surface of said hub, said circular sealing lip extending from the junction of said radial and axial walls of said sealing ring.

10. The improvement set forth in claim 9 in which said circular sealing lip curls axially outwardly in the radially inwardly direction.

11. The improvement set forth in claim 7 in which the non-circularities of the radially inner surface of said magnetic ring and of said radially outwardly facing surface of said groove are formed by one or more flats.

12. The improvement set forth in claim 11 in which the non-circularities of the radially inner surface of said magnetic ring and of said radially outwardly facing surface of said groove are formed by a pair of flats arranged diametrically opposite each other.

* * * * *

UNITED STATES PATENT AND TRADEMARK OFFICE
CERTIFICATE OF CORRECTION

PATENT NO.   : 4,932,245

DATED        : June 12, 1990

INVENTOR(S)  : Randolph A. Shelton

It is certified that error appears in the above-identified patent and that said Letters Patent is hereby corrected as shown below:

Column 3, Line 2:
  Delete "spindle" and insert therefor -- hub --.

Column 4, Line 14:
  Delete "spindle" and insert therefor -- hub --.

Signed and Sealed this

Twenty-second Day of October, 1991

Attest:

HARRY F. MANBECK, JR.

*Attesting Officer*     *Commissioner of Patents and Trademarks*